US010808572B2

(12) United States Patent
Hoffman et al.

(10) Patent No.: US 10,808,572 B2
(45) Date of Patent: Oct. 20, 2020

(54) COOLING STRUCTURE FOR A TURBOMACHINERY COMPONENT

(71) Applicant: General Electric Company, Schenectady, NY (US)

(72) Inventors: James Michael Hoffman, Hamilton Township, OH (US); Jeffrey Ryan Trimmer, Cincinnati, OH (US); Dennis Robert Jonassen, Liberty Township, OH (US); Mark Stephen Zlatic, Cincinnati, OH (US); Patrick John Lonneman, Independence, KY (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 15/943,177

(22) Filed: Apr. 2, 2018

(65) Prior Publication Data

US 2019/0301301 A1    Oct. 3, 2019

(51) Int. Cl.
*F01D 25/12* (2006.01)
*F02C 7/18* (2006.01)
*F01D 9/04* (2006.01)
*F02C 3/04* (2006.01)

(52) U.S. Cl.
CPC ............ *F01D 25/12* (2013.01); *F01D 9/041* (2013.01); *F02C 7/18* (2013.01); *F02C 3/04* (2013.01); *F05D 2240/12* (2013.01); *F05D 2240/35* (2013.01); *F05D 2260/20* (2013.01)

(58) Field of Classification Search
CPC ........ F01D 25/08; F01D 25/12; F01D 25/125; F01D 9/041; F01D 9/06; F01D 9/065; F05D 2240/12; F05D 2240/121; F05D 2240/125; F05D 2240/35; F05D 2260/20; F02C 7/18; F02C 3/04
See application file for complete search history.

(56) References Cited

U.S. PATENT DOCUMENTS

| | | | | |
|---|---|---|---|---|
| 2,291,828 A | * | 8/1942 | New ...................... | F01D 5/145 415/115 |
| 2,652,216 A | * | 9/1953 | Hoffman ................ | F02K 1/822 244/74 |
| 2,848,155 A | * | 8/1958 | Hausmann ............ | F04D 29/682 415/115 |
| 3,365,124 A | * | 1/1968 | Burge .................... | F04D 29/542 415/115 |
| 3,423,069 A | | 1/1969 | Chandley | |
| 3,694,102 A | * | 9/1972 | Conrad ................. | F04D 29/682 415/115 |

(Continued)

*Primary Examiner* — David E Sosnowski
*Assistant Examiner* — Wayne A Lambert
(74) *Attorney, Agent, or Firm* — General Electric; Pamela Kachur

(57) ABSTRACT

A gas turbine engine that includes a turbomachinery core operable to produce a core gas flow and that includes a combustor. A first duct is positioned downstream of and in flow communication with the combustor. A component is positioned within the first duct and extends between radially outward and radially inward walls of the first duct. The component that includes a first cooling passageway formed therein. The first cooling passageway extends between an inlet communicating with the first duct and positioned facing towards the turbomachinery core, and an outlet communicating with a pressure sink.

20 Claims, 4 Drawing Sheets

(56) References Cited

U.S. PATENT DOCUMENTS

| | | | | |
|---|---|---|---|---|
| 3,697,191 A | * | 10/1972 | Heymann | F01D 5/18 |
| | | | | 415/169.3 |
| 3,735,593 A | * | 5/1973 | Howell | F02C 7/045 |
| | | | | 60/226.1 |
| 3,846,038 A | * | 11/1974 | Carriere | F04D 29/682 |
| | | | | 415/1 |
| 3,893,297 A | * | 7/1975 | Tatem, Jr. | F02K 3/11 |
| | | | | 60/224 |
| 3,993,414 A | * | 11/1976 | Meauze | F04D 21/00 |
| | | | | 415/181 |
| 3,999,378 A | * | 12/1976 | Tatem, Jr. | F02K 3/11 |
| | | | | 60/737 |
| 4,109,864 A | * | 8/1978 | Clayton | F01D 25/14 |
| | | | | 239/127.3 |
| 4,254,618 A | * | 3/1981 | Elovic | F02C 7/185 |
| | | | | 60/226.1 |
| 4,453,888 A | * | 6/1984 | Hovan | F01D 5/18 |
| | | | | 415/175 |
| 4,534,701 A | * | 8/1985 | Wisser | F01D 11/08 |
| | | | | 415/168.4 |
| 4,605,315 A | * | 8/1986 | Kokoszka | G01K 13/02 |
| | | | | 374/138 |
| 4,607,657 A | * | 8/1986 | Hirschkron | B64D 33/02 |
| | | | | 137/15.1 |
| 4,732,538 A | * | 3/1988 | Wollenweber | F01D 5/084 |
| | | | | 416/129 |
| 4,817,378 A | * | 4/1989 | Giffin, III | F02K 1/386 |
| | | | | 60/262 |
| 4,852,355 A | * | 8/1989 | Kenworthy | F02C 7/18 |
| | | | | 60/751 |
| 4,987,736 A | * | 1/1991 | Ciokajlo | F01D 9/065 |
| | | | | 415/138 |
| 5,020,318 A | * | 6/1991 | Vdoviak | F01D 9/065 |
| | | | | 60/226.1 |
| 5,480,284 A | * | 1/1996 | Wadia | F04D 29/682 |
| | | | | 416/91 |
| 6,059,530 A | | 5/2000 | Lee | |
| 6,065,932 A | * | 5/2000 | Dodd | F01D 5/081 |
| | | | | 415/115 |
| 6,334,753 B1 | | 1/2002 | Tillman et al. | |
| 6,428,271 B1 | * | 8/2002 | Ress, Jr. | F01D 5/022 |
| | | | | 415/169.1 |
| 6,435,815 B2 | * | 8/2002 | Harvey | F04D 29/684 |
| | | | | 415/115 |
| 6,612,114 B1 | * | 9/2003 | Klingels | F01D 5/187 |
| | | | | 415/115 |
| 6,619,912 B2 | * | 9/2003 | Tiemann | F01D 5/187 |
| | | | | 29/889.7 |
| 6,735,956 B2 | * | 5/2004 | Romani | F01D 5/081 |
| | | | | 415/115 |
| 7,192,245 B2 | | 5/2007 | Djeridane et al. | |
| 7,320,575 B2 | * | 1/2008 | Wadia | F04D 29/681 |
| | | | | 416/97 R |
| 7,708,229 B1 | * | 5/2010 | Angle, II | B64C 21/08 |
| | | | | 244/206 |
| 8,186,965 B2 | | 5/2012 | Kuhne et al. | |
| 8,192,147 B2 | * | 6/2012 | Haas | B64D 33/02 |
| | | | | 415/144 |
| 8,784,051 B2 | * | 7/2014 | Marini | F01D 1/02 |
| | | | | 415/115 |
| 9,488,191 B2 | * | 11/2016 | Matys | F04D 29/542 |
| 9,670,797 B2 | | 6/2017 | Slavens et al. | |
| 9,810,074 B2 | | 11/2017 | Lee et al. | |
| 2006/0222485 A1 | * | 10/2006 | Lardellier | F04D 29/542 |
| | | | | 415/115 |
| 2010/0329847 A1 | * | 12/2010 | Yamashita | F01D 9/041 |
| | | | | 415/115 |
| 2016/0245091 A1 | * | 8/2016 | Kupratis | F01D 5/146 |
| 2017/0218854 A1 | * | 8/2017 | Nestico | F02C 9/20 |
| 2017/0226868 A1 | | 8/2017 | Martinello et al. | |

\* cited by examiner

COOLING STRUCTURE FOR A TURBOMACHINERY COMPONENT

STATEMENT REGARDING FEDERALLY SPONSORED RESEARCH & DEVELOPMENT

The U.S. Government may have certain rights in this invention pursuant to contract number FA8626-16-C-2138 awarded by the Department of the Air Force.

BACKGROUND OF THE INVENTION

The present invention is directed to hot-section turbomachinery components in gas turbine engines, and more specifically to cooling structures of turbomachinery components.

Turbomachinery includes, in sequential flow order: a compressor, a combustor, and one or more turbines. During operation, air is compressed through the compressor and is mixed with fuel in the combustor. The fuel is ignited in the combustor, generating hot, high energy combustion gases which flow downstream through the turbine stages. The turbine stages extract energy from these combustion gases.

To prolong the service life of turbine blades and other hot section components and to reduce engine operating cost, portions of these components, for example turbine blade tips and compressor vanes, often employ "active cooling". This type of cooling is conventionally effected by bleeding off pressurized air at a relatively low temperature from some other portion of the engine such as the compressor. Cooling can be achieved by passing the bleed air through a component to be cooled.

One problem with active cooling is that the use of bleed air is expensive in terms of overall fuel consumption.

BRIEF DESCRIPTION OF THE INVENTION

At least one of these problems is addressed by an engine that includes a component that is configured to be at least partially cooled by gases removed from a hot gas stream.

According to one aspect of the technology described herein, a gas turbine engine includes a turbomachinery core operable to produce a core gas flow and that includes a combustor. A first duct is positioned downstream of and in flow communication with the combustor. A component is positioned within the first duct and extends between radially outward and radially inward walls of the first duct. The component that includes a first cooling passageway formed therein. The first cooling passageway extends between an inlet communicating with the first duct and positioned facing towards the turbomachinery core, and an outlet communicating with a pressure sink.

According to another aspect of the technology described herein, a method is provided of operating turbomachinery that includes a component that is configured to be cooled by air taken from a hot gas stream. The method includes the steps of conducting the hot gas stream by the component such that a first portion of the hot gas stream is at a first temperature and a second portion of the hot gas stream is at a second temperature and the first temperature is lower than the second temperature; and introducing the first portion of the hot gas stream into the component via an inlet.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
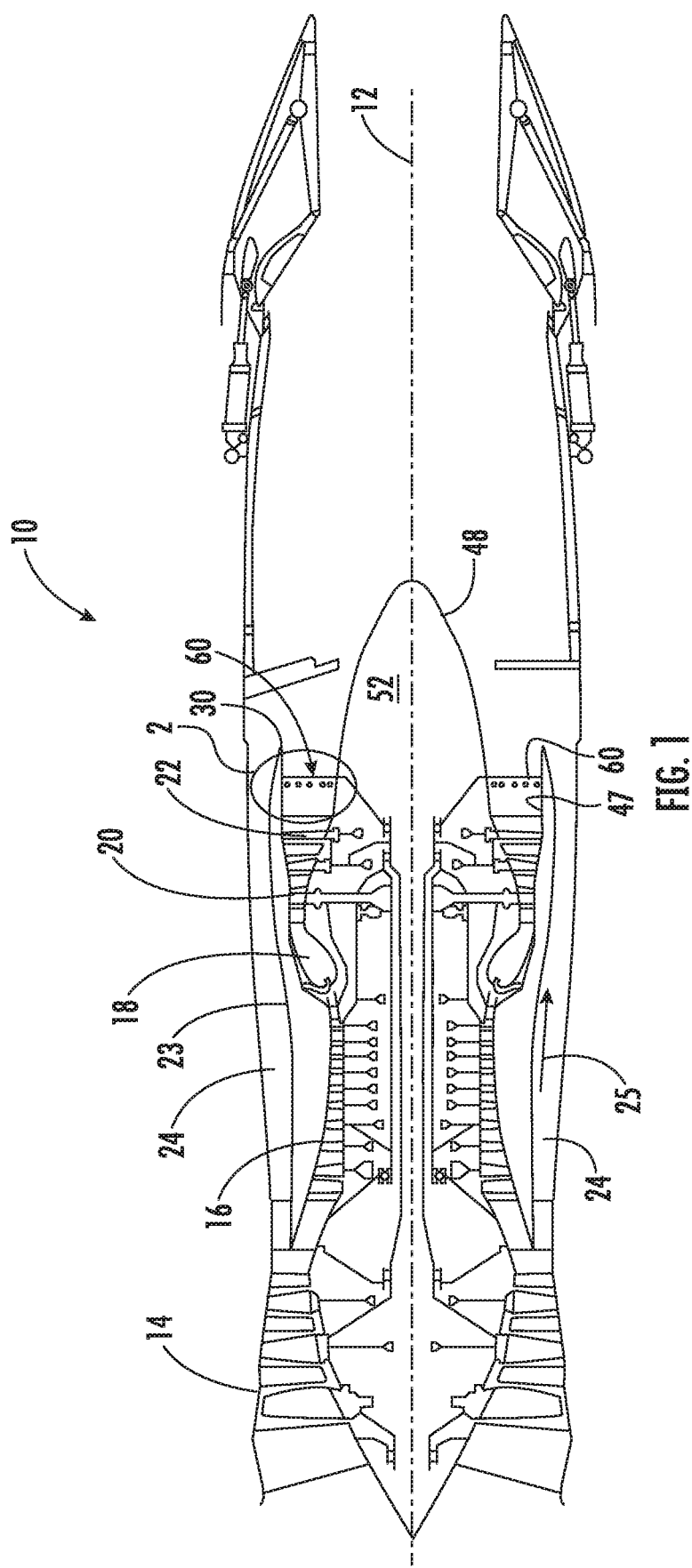
FIG. 1 is a schematic view of an exemplary gas turbine engine.

Referring to the drawings wherein identical reference numerals denote the same elements throughout the various views, FIG. 1 shows a schematic view of an exemplary medium bypass ratio turbofan gas turbine engine 10 for powering an aircraft. The illustrated engine is merely an example. It will be understood that the principles of the present invention are applicable to other types of gas turbine engines, such as turboshaft engines, turbojet engines, turboprop engines, as well as land-based engines or other turbomachinery devices requiring components that are cooled. The engine 10 includes an exhaust vane 60 that has at least a portion of which is configured for active cooling by at least some of the core gas flow passing the exhaust vane 60.

The engine 10 is axially symmetrical about a longitudinal or axial centerline axis 12 and has a fan section 14. The engine 10 includes, in serial downstream flow communication, a multistage axial high-pressure compressor 16, an annular combustor 18, and a high-pressure turbine 20 mechanically coupled to the high-pressure compressor 16. A multistage low-pressure turbine 22 is mechanically coupled to the fan section 14 and is positioned downstream of the high-pressure compressor 16. These components are positioned within a core engine casing 23. A bypass duct 24 surrounds the core engine casing 23 and is configured to contain a bypass airflow 25 during operation. A center body 48 extends axially symmetric to the centerline axis 12 toward an engine exhaust. The center body 48 defines an outer surface 52. An annular diffuser liner 46 (FIG. 2) defines an inner surface 47.

Figure 2:
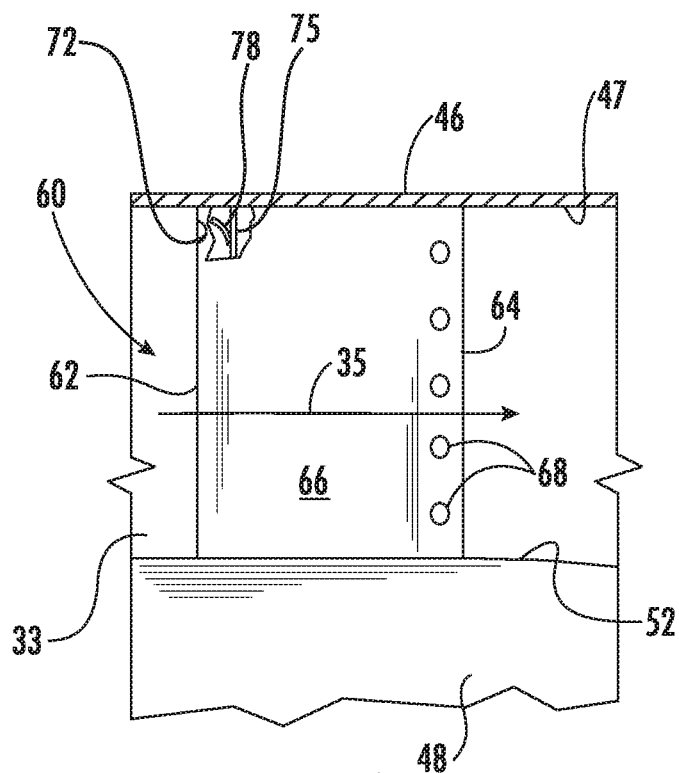
FIG. 2 shows a partially sectioned view of an exhaust vane of the engine of FIG. 1.
Figure 3:
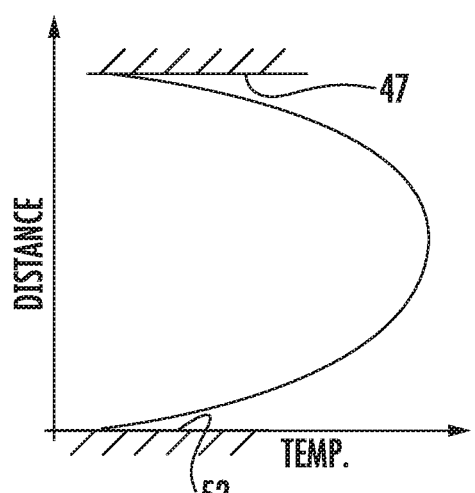
FIG. 3 shows a graphical representation of temperature distribution across the vane of FIG. 2.
Figure 4:
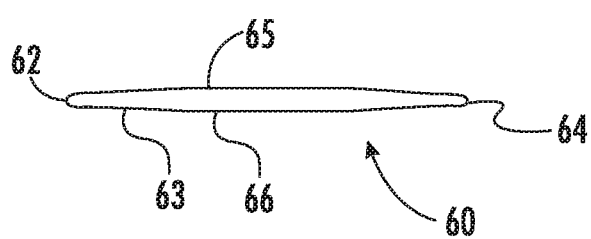
FIG. 4 shows an end view of the vane of FIG. 2.

Referring to FIGS. 2-4, the inner surface 47 and the outer surface 52 define a diffuser duct 33 that extends to an annular core outlet 30 (FIG. 1). The diffuser duct 33, is configured to contain a core gas stream 35. A plurality of exhaust vanes 60 are positioned within the diffuser duct 33 such that the core gas stream 35 flows past the plurality of exhaust vanes 60. It will be understood that the exhaust vanes 60 are merely one example of a component that can be cooled using a core gas flow according to the principles described herein.

Each of the exhaust vanes 60 extends from the outer surface 52 of the center body 48 radially outward to the inner surface 47 of the diffuser liner 46. Each of the exhaust vanes 60 is generally airfoil-shaped and includes a leading edge 62, a first side wall 63, a trailing edge 64 and a second side wall 65. The trailing edge 64 is positioned downstream of the leading edge 62. A plurality of outlets 68 are defined near the trailing edge 64. The outlets 68 are configured to exhaust spent cooling gases from within the exhaust vanes 60 into the core gas stream 35.

Figure 9:
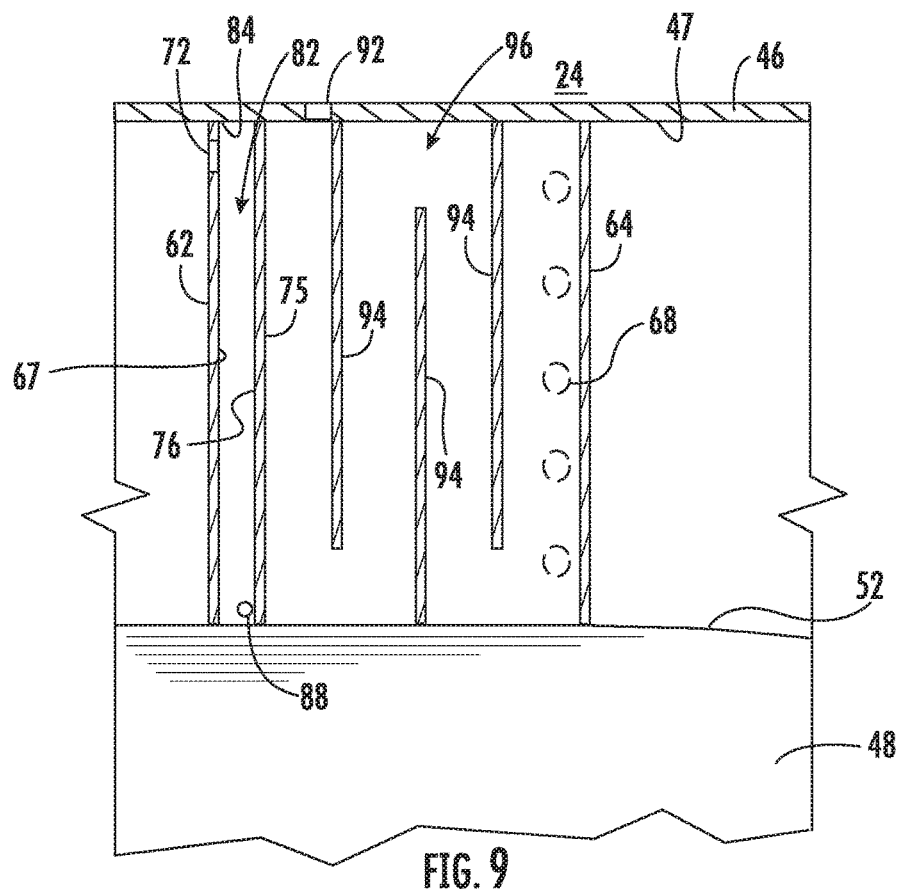
FIG. 9 shows a section view of the vane of FIG. 2.

Referring now to FIG. 9 in addition to FIGS. 2-4, each of the vanes 60 has a first passageway 82 defined therein that are configured for auxiliary cooling of the vane 60. The passageway 82 extends along the leading edge 62 between the outer surface 52 and the inner surface 47 of the diffuser liner 46. A cooling inlet 72 is formed through the leading edge wall 62 and positioned near the diffuser liner 46. The cooling inlet 72 is positioned so as to recover dynamic pressure of the core gas stream 35. For example, the cooling inlet 72 may be positioned at an aerodynamic leading edge of the vanes 60, and/or may positioned parallel to the direction of flow of the core gas stream 35. Optionally, the cooling inlet 72 can be positioned near the center body 48. A turning element 78 (FIG. 2) is positioned within the passageway 82 near the cooling inlet 72 such that gas flow entering the passageway 82 through the cooling inlet 72 is directed along the passageway 82 to the opposite end.

The passageway 82 is defined between a surface 76 of a wall 75 that is spaced-away from the leading edge 62 and an inner surface 67 of the leading edge 62. An outlet 88 is defined through the surface 66 of the vane 60. The passageway 82 is fluidly connected to the diffuser duct 33 through the outlet 88. The outlet 88 is positioned such that in use, is exposed to a lower pressure than the cooling inlet 72. For example, the outlet 88 may be positioned on the surface 66 such that is exposed to the prevailing static pressure of the core gas stream 35 but not the dynamic pressure. Alternatively, the outlet 88 may discharge to another location of lower pressure than the dynamic pressure of the core gas stream, such as the interior of the center body 48. Such a location would operate as a pressure sink. The passageway 82 is configured to be operable as a cooling passage as will be described further below.

The exhaust vanes 60 also each include means for providing conventional active cooling via a passageway 96 that is defined therein. As shown in FIG. 9, a cooling inlet 92 is defined through the diffuser liner 46 such that the passageway 96 is fluidly connected to the bypass duct 24. The passageway 96 is generally serpentine as shown in FIG. 9 and is defined in part by a plurality of partial walls 94. The passageway 96 is configured to conduct airflow from the bypass duct 24 through the interior of the vane 60 through the outlets 68 and into the exhaust flow of the engine 10. Thus, the passageway 96 is operable as a conventional cooling passageway.

The technology described herein can be better understood through a description of the operation thereof. During operation, the engine 10 generates a bypass airflow 25 (FIG. 1) through the bypass duct 24. The engine 10 also generates a core gas stream 35 through the diffuser duct 33. The core gas stream 35 passes over and around the plurality of vanes 60. The core gas stream 35 comprises combustion gases generated in the combustor 18 that have passed through the turbines 20, 22. The core gas stream is at an elevated temperature compared to ambient conditions. The inlet 72 and the outlet 88 are located and dimensioned such that a portion of the core gas stream 35 enters inlet 72, flows along the passageway 82, and exits the outlet 88.

Referring now to FIG. 3 and the graph shown there, the temperature of the core gas stream 35 varies with distance away from the inner surface 47 of the diffuser liner 46 and the outer surface 52 of the center body 48. As shown in FIG. 3, the highest temperature within the core gas stream 35 occurs generally near the center of the diffuser duct 33. The lowest temperatures of the core gas stream 35 occurs nearest each of the inner surfaces 47 and 52.

As shown in FIG. 2, the inlet 72 is positioned in the vane 60 such that the inlet 72 is near the inner surface 47 of the diffuser liner 46. In this regard, the inlet 72 is positioned such that relatively cool air can be introduced into the passageway 82. As the relatively cool air passes through the inlet 72 it impinges upon the turning element 78. The turning element 78 operates to guide the air along the length of the passageway 82 reduces pressure loss due to turbulence that might be present if the turning element 78 were not in place. Such pressure loss within the passageway 82 could reduce the overall flow rate of cooling gas through the passageway 82 and thus reduce the amount of cooling available to the leading edge portion 62 of the vane 60.

To provide cooling of the leading edge portion 62 of the vane 60, the gas flow within the passageway 82 must be lower than the temperature of the inner surface 67. It should be appreciated that cooling efficiency is increased when the temperature difference between the gas flow and the adjacent inner surface 63 is increased. The inlet 72 is positioned within the diffuser duct 33 such that relatively cooler air from the core gas stream 35 is introduced into the inlet 72. The inlet 72 is positioned to recover dynamic pressure of the core gas stream 35 and exhaust to a location within the duct 33 that is at a lower pressure. In this manner, the required pressure differential to drive cooling flow through the passageway 82 is provided.

It should be noted that the shape of the temperature profile as shown in FIG. 3, and the difference between the maximum temperature of the gas core stream 35 and the minimum temperature of the core gas stream 35 will vary depending on the operating conditions of the engine 10 at a given time. In some examples, the difference between the maximum and minimum temperatures could be on the order of several hundred degrees. For the purposes of the disclosed technology, if the gas temperature anywhere across the temperature profile of the core gas flow is lower than the metal temperature of the component to be cooled by any amount, then exposure of the component to the lower temperature core gas flow will produce cooling of the component. Accordingly, effective cooling may be obtained by positioning the inlet 72 near either one of the surfaces 47 or 52. In this context, the term "near" referring to the surfaces 47 or 52 refers to sufficient proximity to achieve a useful cooling effect for a particular application. As one example, the inlets 72 may be positioned closer to one of the surfaces 47, 52 than to the opposed surface. In another example, the inlets 72 may be positioned no further away from one of the surfaces 47, 52 than one-third of the total distance between the two surfaces 47, 52. In another example, the inlets 72 may be positioned no further away from one of the surfaces than 10% of the total distance between the surfaces 47, 52. In yet another example, the inlets 72 may be positioned immediately adjacent the surface 47 or the surface 52.

Figure 5:
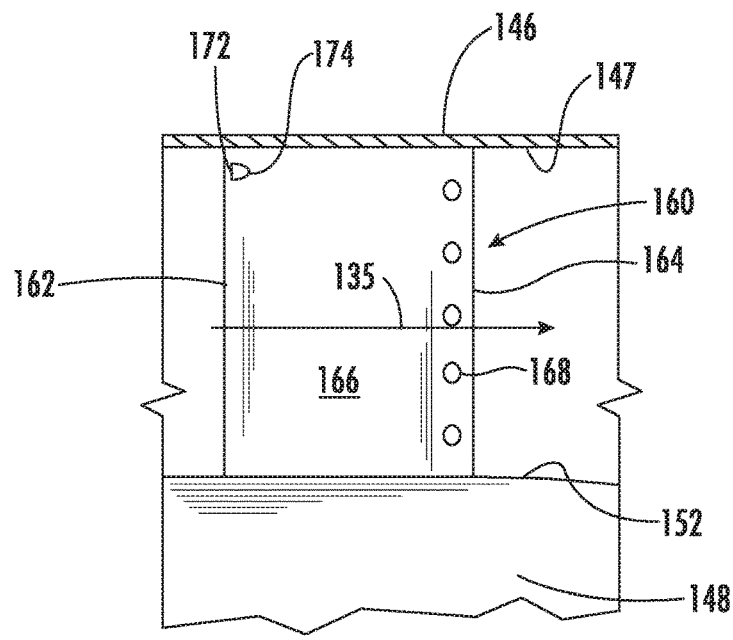
FIG. 5 shows a partially sectioned view of the engine showing the vane of FIG. 2 according to another embodiment.
Figure 6:
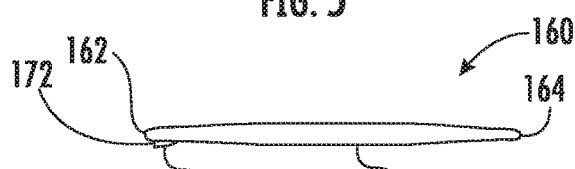
FIG. 6 shows an end view of the vane of FIG. 5.

Referring now to FIGS. 5 and 6, there is provided an alternative embodiment. Elements associated with reference numbers in the 100 series can be generally understood from descriptions of elements associated with similar reference numbers of the zero series above. Referring now to FIG. 5 there is shown a vane 160 that includes a leading edge 162 and a trailing edge 164. A surface 166 is defined by the vane 160 and a plurality of cooling holes or outlets 168 pass through the surface 166 and are positioned near the trailing edge 164. The vane 160 extends from the outer surface 152 of the center body 148 to the inner surface 147 of the diffuser liner 146. An inlet 172 is defined through the surface 166 near the inner surface 147 of the diffuser liner 146. The inlet 172 is partially surrounded by a protruding scoop 174. As can be seen in FIG. 6, the scoop 174 extends away from the surface 166 of the vane 160. The core gas stream 135 passes around the vanes 160 such that a portion of the core gas stream 135 is collected by the scoop 174 and introduced into the interior of the vane 160 through the inlet 172.

Figure 7:
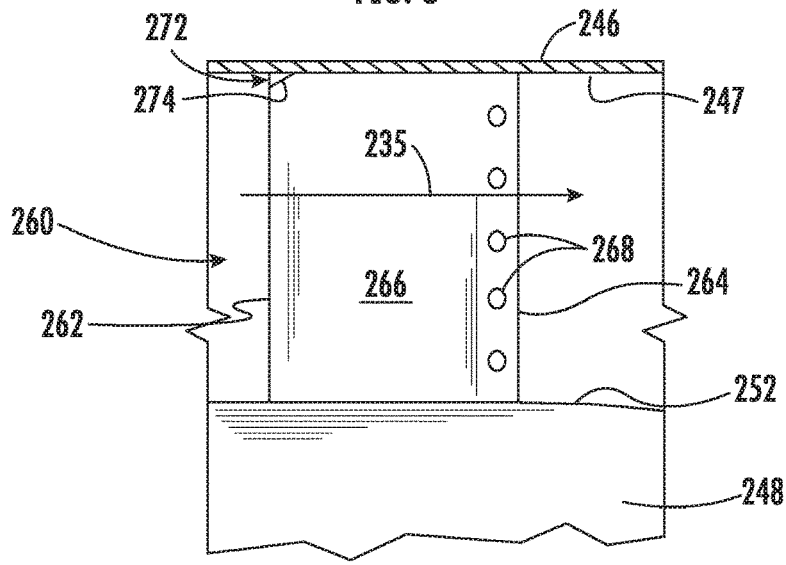
FIG. 7 shows a partially sectioned view of the engine showing the vane of FIG. 2 according to yet another embodiment.
Figure 8:
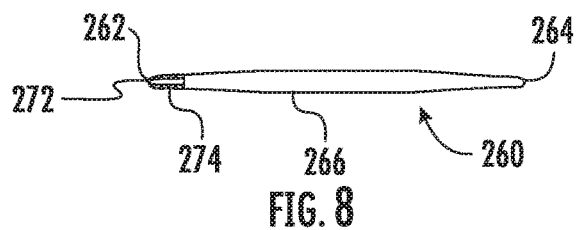
FIG. 8 shows an end view of the vane of FIG. 7.

Referring now to FIGS. 7 and 8, there is provided another alternative embodiment. Elements associated with reference numbers in the 200 series can be generally understood from descriptions of elements associated with similar reference numbers of the zero series above. Referring now to FIG. 7 there is shown vane 260 that includes a leading edge 262 and a trailing edge 264. A surface 266 is defined by the vane 260 and a plurality of cooling holes or outlets 268 pass through the surface 266 and are positioned near the trailing edge 264. The vane 260 extends from the inner surface 252 of the center body 248 to the outer surface 247 of the diffuser liner 246. An inlet 272 is defined through the surface 266 near the inner surface 247 of the diffuser liner 246. The inlet 272 is partially surrounded by a notch 274. The core gas stream 235 passes around the vanes 260 such that a portion of the core gas stream 235 is collected by the notch 274 and introduced into the interior of the vane 260 through the inlet 272.

Figure 10:
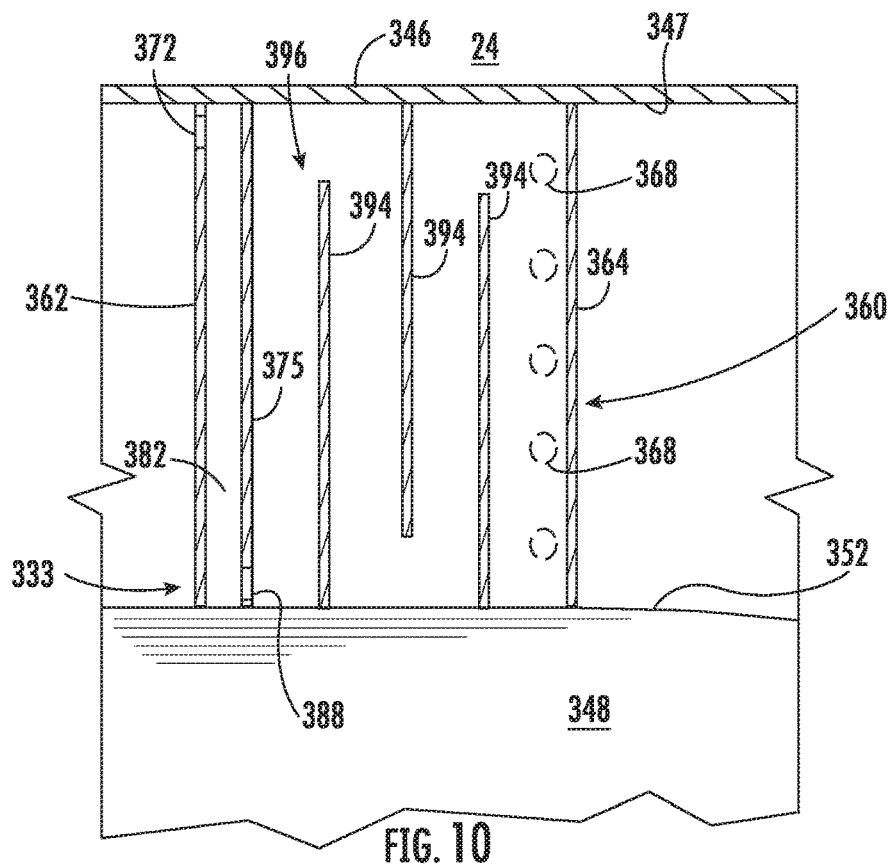
FIG. 10 shows a section view of the vane of FIG. 9 according to another embodiment.

Referring now to FIG. 10, there is provided yet another alternative embodiment. Elements associated with reference numbers in the 300 series can be generally understood from descriptions of elements associated with similar reference numbers of the zero series above. A plurality of exhaust vanes 360 each includes a leading edge 362 and a trailing edge 364. The vane 360 extends from the outer surface 352 of the center body 348 to the inner surface 347 of the diffuser liner 346. Each exhaust vane 360 includes cooling provided by a passageway 396 that is fluidly connected to an auxiliary cooling passageway 382 that is formed between a wall 375 and the leading edge 362. Cooling air enters the passageway 382 via an inlet 372. The auxiliary cooling passageway 382 is fluidly connected to a passageway 396 via an outlet 388 formed through the wall 375.

The passageway 396 is generally serpentine and is defined by a plurality of partial walls 394. The passageway 396 is configured to conduct airflow from the diffuser duct 333 through the vanes 360, exiting via the outlet holes 368.

The foregoing has described a cooled component for a turbomachinery core. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gas turbine engine, comprising:
   a turbomachinery core that is operable to produce a core gas flow and that includes a combustor;
   a first duct positioned downstream of, and in flow communication with, the combustor;
   a component positioned within the first duct and extending between radially outward and radially inward walls of the first duct, the component including a first cooling passageway formed therein;
   wherein the first cooling passageway extends between an inlet communicating with the first duct and positioned facing towards the turbomachinery core, and an outlet communicating with a pressure sink.

2. The engine according to claim 1, further comprising a second duct surrounding the first duct.

3. The engine according to claim 2, wherein the component includes a second cooling passageway that is fluidly connected to the second duct and the first duct.

4. The engine according to claim 3, wherein the component is positioned within the first duct such that the component has a first end near the radially outward wall of the first duct and a second end that is positioned near the radially inward wall of the first duct.

5. The engine according to claim 4, wherein the inlet of the first cooling passageway is positioned near one of the radially inward wall and the radially outward wall.

6. The engine according to claim 1, wherein a scoop is positioned on an exterior surface of the component such that the scoop is near the inlet of the first cooling passageway and is configured to guide air into the inlet of the first cooling passageway.

7. The engine according to claim 1, wherein the component includes a first side wall and a second side wall and the inlet is defined as an opening through the first side wall.

8. The engine according to claim 1, wherein the component includes a first side wall and an opposing second side wall and the inlet is defined as a notch that extends between the first side wall and the second side wall.

9. The engine according to claim 8, wherein the notch extends between the leading edge and an end of the component.

10. The engine according to claim 1, wherein the inlet is positioned such that it is configured to be exposed to a dynamic pressure of the core gas flow and the outlet is positioned such that it is configured to be exposed to a pressure that is lower than the dynamic pressure of the core gas flow.

11. The engine according to claim 1, wherein the core gas flow defines a temperature profile that has a lower temperature near the radially inward and radially outward walls of the duct.

12. The engine according to claim 1, wherein the component is an exhaust vane.

13. A method of cooling a component in an engine of the type including a turbomachinery core operable to produce a core gas flow, the method comprising the steps of:
   conducting the core gas flow past the component such that a first portion of the core gas flow is at a first temperature and a second portion of the core gas flow is at a second temperature, and the first temperature is lower than the second temperature;
   introducing the first portion of the core gas flow into an internal first cooling passageway of the component via an inlet.

14. The method according to claim 13, further comprising the step of driving the first portion of the core gas flow through the component.

15. The method according to claim 14, further comprising the step of guiding the first portion of the core gas flow into the inlet with a scoop.

16. The method according to claim 15, further comprising the step of turning the first portion of the core gas flow along the first cooling passageway of the component by a turning element that is positioned within the first cooling passageway.

17. The method according to claim 15, wherein the first portion of the core gas flow exits the component via an outlet positioned near a trailing edge of the component.

18. The method according to claim 13, wherein the component includes a second cooling passageway and the second cooling passageway is fluidly connected to a second airstream via a second inlet and is configured to exhaust into the core gas flow via a plurality of outlets defined through a surface of the component.

19. The method according to claim 13, further comprising the step of exhausting the first portion of the core gas flow through a plurality of outlets positioned near a trailing edge of the component.

20. The method according to claim 13, wherein the first cooling passageway is defined by an interior surface of the component and the temperature of the first portion of the core gas flow is lower than the temperature of at least some of the interior surface of the component.

\* \* \* \* \*